US006980576B2

(12) United States Patent
Frolov et al.

(10) Patent No.: US 6,980,576 B2
(45) Date of Patent: Dec. 27, 2005

(54) PUMP DISTRIBUTION NETWORK FOR MULTI-AMPLIFIER MODULES

(75) Inventors: Sergey Frolov, Berkeley Heights, NJ (US); Joseph Shmulovich, New Providence, NJ (US); Paul Francis Wysocki, Westfield, NJ (US)

(73) Assignee: Inplane Photonics, Inc., South Plainfield, NJ (US)

( * ) Notice: Subject to any disclaimer, the term of this patent is extended or adjusted under 35 U.S.C. 154(b) by 34 days.

(21) Appl. No.: 10/360,577

(22) Filed: Feb. 7, 2003

(65) Prior Publication Data

US 2004/0156096 A1 Aug. 12, 2004

(51) Int. Cl.[7] .......... H01S 3/00
(52) U.S. Cl. .......... 372/38.06; 359/341.32
(58) Field of Search .......... 372/38.06; 359/341.32

(56) References Cited

U.S. PATENT DOCUMENTS

| | | | | |
|---|---|---|---|---|
| 5,039,190 A | | 8/1991 | Blonder et al. | 359/341 |
| 5,135,605 A | | 8/1992 | Blonder et al. | 156/628 |
| 5,774,607 A | | 6/1998 | Shiraishi et al. | 385/33 |
| 5,966,478 A | | 10/1999 | Marcuse et al. | 385/14 |
| 5,978,130 A | * | 11/1999 | Fee et al. | 359/341.32 |
| 6,008,934 A | | 12/1999 | Fatehi et al. | 359/341 |
| 6,157,765 A | | 12/2000 | Bruce et al. | 385/129 |
| 6,359,730 B2 | * | 3/2002 | Tervonen | 359/349 |
| 6,373,623 B1 | * | 4/2002 | Ohshima et al. | 359/341.3 |
| 6,462,864 B1 | * | 10/2002 | Lange et al. | 359/341.1 |
| 6,643,058 B2 | * | 11/2003 | Pianciola et al. | 359/341.3 |
| 6,668,112 B1 | * | 12/2003 | Kaneda | 385/31 |
| 2003/0185518 A1 | * | 10/2003 | Bennett et al. | 385/53 |
| 2003/0234353 A1 | * | 12/2003 | Wiese et al. | 250/239 |
| 2004/0001717 A1 | * | 1/2004 | Bennett et al. | 398/92 |

OTHER PUBLICATIONS

J. Hübner et al., "Planar Er- and Yb-doped Amplifiers and Lasers", *Applied Physics B: Lasers and Optics*, vol. 73, 2001, pp. 435-438.

Lucas B. Soldano et al., "Optical Multi-Mode Interference Devices Based on Self-Imaging: Principles and Applications," *IEEE Journal of Lightwave Technology*, vol. 13, No. 4, Apr. 1995, pp. 615-627.

Ricardo Olivares et al., "A New WDM Amplifier Cascade for Improved Performance in Wavelength-Routed Optical Transport Networks," *Optical Fiber Technology*, vol. 5, 1999, pp. 62-74.

Neil S. Lagali et al., "Analysis of Generalized Mach-Zehnder Interferometers for Variable-Ratio Power Splitting and Optimized Switching," *IEEE Journal of Lightwave Technology*, vol. 17, No. 12, Dec. 1999, pp. 2542-2550.

* cited by examiner

*Primary Examiner*—Jack Keith
*Assistant Examiner*—Deandra M. Hughes
(74) *Attorney, Agent, or Firm*—Mayer Fortkort & Williams PC; Stuart H. Mayer, Esq.

(57) ABSTRACT

An integrated optical device is provided for distributing optical pump energy. The device includes at least one input port for receiving optical energy, a plurality of output ports, and a user configurable optical network coupled to the input port for distributing the optical energy among the output ports in a prescribed manner in conformance with a user-selected configuration.

27 Claims, 3 Drawing Sheets

PUMP DISTRIBUTION NETWORK FOR MULTI-AMPLIFIER MODULES

FIELD OF THE INVENTION

The present invention relates generally to planar waveguide components that can be used to simultaneously provide optical pump power for a number of independent optical amplifiers.

BACKGROUND OF THE INVENTION

Modern telecommunications rely heavily upon transmission of light signals across long spans of optical fiber. As the light propagates from a transmitter to a receiver through the optical network, it loses energy (primarily due to light scattering) in the transmission fiber itself and also (by more general loss mechanisms) in the other fiber-optic components of the network. In order to compensate for this energy depletion, the optical power of a signal is repeatedly amplified by optical amplifiers. An erbium-doped fiber amplifier, or EDFA, which amplifies optical signals in the wavelength range from about 1520 nm to 1620 nm, has become an integral part of most modern optical networks. This is discussed, for example, in the new volumes (IIIA and IIIB) of the series "Optical Fiber Telecommunications", edited by I. P. Kaminow and T. L. Koch, Academic Press (1997). The increasingly common use of EDFA's in this context now often leads to a situation where it is desirable to have more than one amplifier at a single location in the network. It has therefore been proposed to use in such instances special modules incorporating multiple separate amplifiers, or amplifier arrays. Examples of arrayed rare-earth doped amplifiers are described in "Planar Er— and Yb-doped amplifiers and lasers" by Balslev, S.; Dyngaard, M.; Feuchter, T.; Guldberg-Kjaer, S.; Hubner, J.; Jensen, C.; Shen, Y.; Thomsen, C. L.; Zauner, D. Applied Physics B v.73(5–6), pp.435–438, 2001, and in "New WDM amplifier cascade for improved performance in wavelength-routed optical transport networks" by Olivares, R.; Baroni, S.; Di Pasquale, F.; Bayvel, P.; Anibal Fernandez, F. Optical Fiber Technology v.5(1), pp.62–74, 1999.

An erbium-doped waveguide amplifier, or EDWA (a recent example of which has been described in U.S. Pat. No. 6,157,765 by A. J. Bruce and J. Shmulovich), has properties similar to those of an EDFA, and therefore its functionality is equally important. However, unlike EDFA's, EDWA's are waveguides manufactured on planar substrates using glass hosts that may differ dramatically in composition from those used in EDFA's. Although generally somewhat less efficient than EDFA's, in many instances EDWA's have advantages compared to their fiber analogs: for example, a packaged EDWA chip has much smaller size than a packaged EDFA. Moreover, it is natural and straightforward to integrate an EDWA with other passive or active optical components on the same planar substrate, an assembly that is impossible with EDFA's. Also, in some instances the integrated module may be able to perform functions that are not achievable by its modular fiber-optic analog.

Typically, at least two kinds of optical energies are present in EDFA's and EDWA's: first one is that of one or more signals with wavelengths from around 1520 to 1620 nm, the second one is that of one or more optical pumps with wavelengths around 980 nm and 1480 nm. The purpose of the pump light is to deliver energy to Er ions in an EDFA and excite them; a part of that energy is subsequently transferred to the signal light resulting in its amplification. Amplifier arrays become especially attractive when the number of required pump sources is less than the number of individual amplifiers. For instance, if a single pump laser is used to simultaneously provide pump power for four separate amplifiers, it could potentially result in four-fold savings in pump cost. U.S. Pat. No. 6,008,934 by Fatehi et al. describes a module incorporating several essentially independent amplifiers and pump power splitters. The latter splitters provide fixed and equal pump power distribution among all the amplifiers, thereby making them interdependent and prohibiting independent gain control in separate amplifiers. Therefore, the use of such a module is limited only to narrow band, single channel amplification. In order for this module to be useful in broad band applications utilizing several wavelength-multiplexed channels, each amplifier has to be provided with a means of independent gain control. Typically, this is accomplished by varying the pump power, which so far could only be achieved by providing each amplifier in the amplifier array with a separate pump laser.

SUMMARY OF THE INVENTION

In accordance with the present invention, an integrated optical device is provided for distributing optical pump energy. The device includes at least one input port for receiving optical energy, a plurality of output ports, and a user configurable optical network coupled to the input port for distributing the optical energy among the output ports in a prescribed manner in conformance with a user-selected configuration.

In accordance with another aspect of the invention, the at least one input port comprises a plurality of input ports and the optical network further comprises at least one optical mixer optically coupled to the plurality of input ports. The optical mixer is optically coupled to the plurality of output ports for incoherently mixing the optical pump energy among the plurality of output ports.

In accordance with another aspect of the invention, the optical network further comprises at least one optical splitter optically coupled to the input port. The optical splitter is optically coupled to the plurality of output ports for distributing the optical energy among the output ports.

In accordance with yet another aspect of the invention, the optical network further comprises at least one variable optical attenuator optically coupled to at least one of the ports for providing variable attenuation thereto.

In accordance with another aspect of the invention, the optical splitter is a variable optical splitter for dividing the optical pump energy among the plurality of output ports in a user-prescribable manner. In accordance with another aspect of the invention, the optical network is formed from a planar lightwave circuit.

In accordance with another aspect of the invention, at least two rare-earth doped optical waveguides are provided for receiving the optical pump energy from the optical network.

In accordance with another aspect of the invention, the rare-earth doped optical waveguides define individual stages of a multistage optical amplifier in which optical signal power from one stage is coupled into the other stage.

In accordance with another aspect of the invention, at least one pump source is coupled to the input port such that optical power is distributed from the pump source to the rare-earth doped optical waveguides.

In accordance with another aspect of the invention, at least one of the optical rare-earth doped optical waveguides is a planar waveguide.

In accordance with another aspect of the invention, at least one of the optical rare-earth doped optical waveguides is a planar waveguide and the other optical rare-earth doped optical waveguide is a fiber waveguide.

In accordance with another aspect of the invention, the rare-earth doped optical waveguides are rare-earth doped optical fibers.

In accordance with another aspect of the invention, the optical network and the two rare-earth doped optical waveguides are formed on a common substrate.

In accordance with another aspect of the invention, a planar optical device provides optical amplification. The device includes a first plurality of signal input waveguides each receiving an optical signal, at least one pump input waveguide receiving optical pump energy, and a plurality of rare earth doped waveguides. A plurality of coupling waveguides respectively couples the optical signal and the optical pump energy to the plurality of rare earth doped waveguides. A plurality of output waveguides are coupled to the rare earth doped waveguides for providing a plurality of amplified optical signals to an external element. The first plurality of signal input waveguides, the pump input waveguide, the plurality of rare earth doped waveguides, the plurality of coupling waveguides, and the plurality of output waveguides are planar waveguides formed on at least one substrate.

In accordance with another aspect of the invention, the first plurality of signal input waveguides, the pump input waveguide, the plurality of rare earth doped waveguides, the plurality of coupling waveguides, and the plurality of output waveguides are planar waveguides formed on a common substrate.

In accordance with another aspect of the invention, the first plurality of signal input waveguides, the pump input waveguide, the plurality of rare earth doped waveguides, the plurality of coupling waveguides, and the plurality of output waveguides are planar waveguides respectively formed on a plurality of different substrates.

In accordance with another aspect of the invention, at least two of the plurality of rare earth doped waveguides are configured for different performance applications.

In accordance with another aspect of the invention, the different performance applications include optical pre-amplification and optical power amplification.

In accordance with another aspect of the invention, an optical device provides optical amplification. The device includes a first plurality of signal input waveguides each receiving an optical signal, at least one pump input waveguide receiving optical pump energy, and a plurality of rare earth doped waveguides. At least two of the plurality of rare earth doped waveguides are configured for different performance applications. The device also includes a plurality of coupling waveguides respectively coupling the optical signal and the optical pump energy to the plurality of rare earth doped waveguides. A plurality of output waveguides are coupled to the rare earth doped waveguides for providing a plurality of amplified optical signals to an external element.

In accordance with another aspect of the invention, the different performance applications include optical pre-amplification and optical power amplification.

In accordance with another aspect of the invention, the differently configured rare earth doped waveguides have at least one difference selected from the group consisting of cross-sectional dimension, length, dopant concentration, and composition.

In accordance with another aspect of the invention, the first plurality of signal input waveguides, the pump input waveguide, the plurality of rare earth doped waveguides, the plurality of coupling waveguides, and the plurality of output waveguides are optical fiber waveguides.

In accordance with another aspect of the invention, at least one waveguide, selected from among the first plurality of signal input waveguides, the pump input waveguide, the plurality of rare earth doped waveguides, the plurality of coupling waveguides, and the plurality of output waveguides, is an optical fiber waveguide.

In accordance with another aspect of the invention, a method is provided for distributing optical pump energy. The method begins by receiving optical pump energy at an input of an optical network. In addition, the optical network is configured for distributing the optical pump energy among a plurality of output ports in a prescribed manner.

In accordance with another aspect of the invention, the optical pump energy is incoherently distributed among the plurality of output ports.

In accordance with another aspect of the invention, the optical energy is distributed among the output ports in a user-prescribable manner.

In accordance with another aspect of the invention, a method is provided for amplifying optical signals. The method begins by directing a first optical signal and optical pump energy to a first rare-earth doped waveguide for providing optical gain to the first optical signal. The first erbium-doped waveguide are formed on a planar substrate. A second optical signal and optical pump energy are directed to a second rare earth-doped waveguide for providing optical gain to the second optical signal. The second waveguide is formed on the planar waveguide. Finally, the optical pump energy received from a pump source is split prior to directing it to the first and and second erbium-doped waveguides.

DETAILED DESCRIPTION

The invention describes an integrated planar-waveguide device incorporating a configurable pump power distribution network and several separate optical amplifiers. In general, the device has N pump input ports and M amplifiers, where N is less than or equal to M. The essential function of this device is to couple optical power from one or more pump laser sources into its N inputs and provide a prescribed distribution of output power into its M amplifiers. In this manner the device is able to make an efficient use of amplifier arrays and other multi-amplifier modules.

Figure 1:
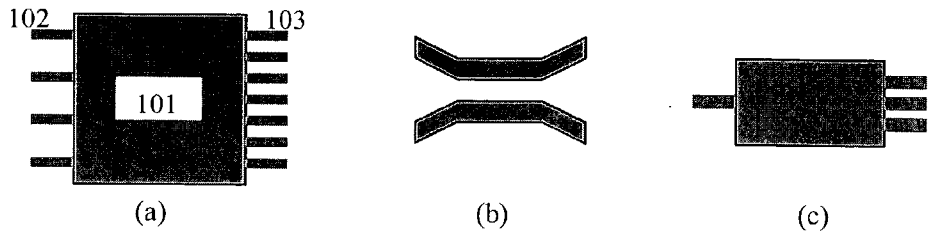
FIG. 1 A few schematic configurations of N×M network layouts that can be implemented using planar network technology.
Figure 2:
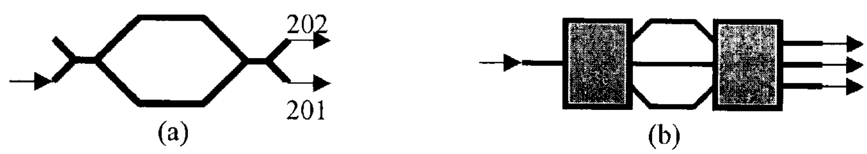
FIG. 2 Schematics of (a) a directional coupler and (b) a Mach-Zehnder interferometer as respective examples of configurable and re-configurable power-splitting networks.
Figure 3:
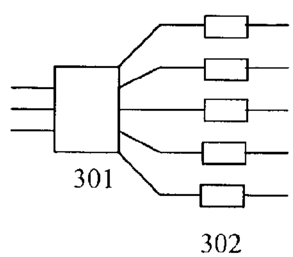
FIG. 3 Schematic of a 3×5 power splitter providing equal power to five variable optical attenuators.

The general layout of an N×M network (101) with N inputs (102) and M outputs (103) is shown in FIG. 1(*a*). Many examples of such a network have been implemented using planar waveguide technology—from the simplest 2×2 directional coupler (see for example "Theory of Dielectric Optical Waveguides" by D. Marcuse, Academic Press, Boston, 1991) shown in FIG. 1(*b*) to more complex multimode interference, or MMI, couplers (see for example "Optical Multi-Mode Interference Devices Based on Self-Imaging: Principles and Applications" by L. B. Soldano and E. C. M. Pennings, J. Lightwave Tech. 13(4), pp.615–627, 1995) shown in FIG. 1(*c*). Reconfigurable N×M networks have also been proposed, which in general provide arbitrary power splitting ratio between N input ports and M output ports. A configurable network can be realized using, for instance, directional couplers or Mach-Zehnder interferometers (MZI's). A directional coupler can be configured to provide an arbitrary power split between its two output ports; however, after this coupler is manufactured in a particular configuration, this configuration cannot be changed. A MZI can provide means for obtaining a re-configurable splitting ratio: as shown in FIG. 2(*a*), it can produce any splitting ratios from 100% of power in the $1^{st}$ port (201) to 100% of power in the $2^{nd}$ port (202) by varying the optical phase in one arm with respect to the phase in the other arm. A more generalized approach to variable splitting between M outputs using MZI's is described in "Analysis of Generalized Mach-Zehnder Interferometers for Variable-Ratio Power Splitting and Optimized Switching" by N. S. Lagali et al. J. Lightwave Tech. 17(12), pp.2542–2550 (1999) and shown in FIG. 2(*b*). Alternatively, as shown in FIG. 3, one could use a fixed N×M network (301) to provide an equal power distribution among its M outputs, which are then followed by M independent variable optical attenuators, or VOA's (302). This is a less energy-efficient design since each VOA discards part of the optical energy. However, this approach does greatly simplify the control of power splitting and could easily be applied to all cases of re-configurable power distribution.

The emissions from two or more separate lasers emitting independently are usually mutually incoherent (i.e. having no fixed and stable phase relationship) even when the emission wavelengths are very closely spaced. Therefore, a special optical mixer may be required that evenly distributes power from N input power sources among its M output ports. By definition, such a mixer is an incoherent mixer. Its design can be based on a fixed power distribution network, such as that depicted in FIG. 1(*a*), which divides the optical power at each of its N inputs into M equal parts and evenly distributes these parts among each of its M outputs. For example, the incoherent mixing of N one-Watt sources will produce N/M Watts at each output port. One more specific example of such a mixer could be 3×3 MMI coupler with the length equal to $L_\pi/3$, where $L_\pi$ is the MMI coupling length. In the case, when three incoherent sources are present at the three inputs of this MMI coupler, optical energy at each input is equally split into three parts and distributed among the three outputs of the mixer. Generally, there is some wavelength dependence for an equal power splitting to each channel. Therefore, in order to obtain an accurate even-power distribution, the emission wavelengths of the mixed sources should be within the spectral range defined by the wavelength-independence range of a particular mixer design.

Figure 4:
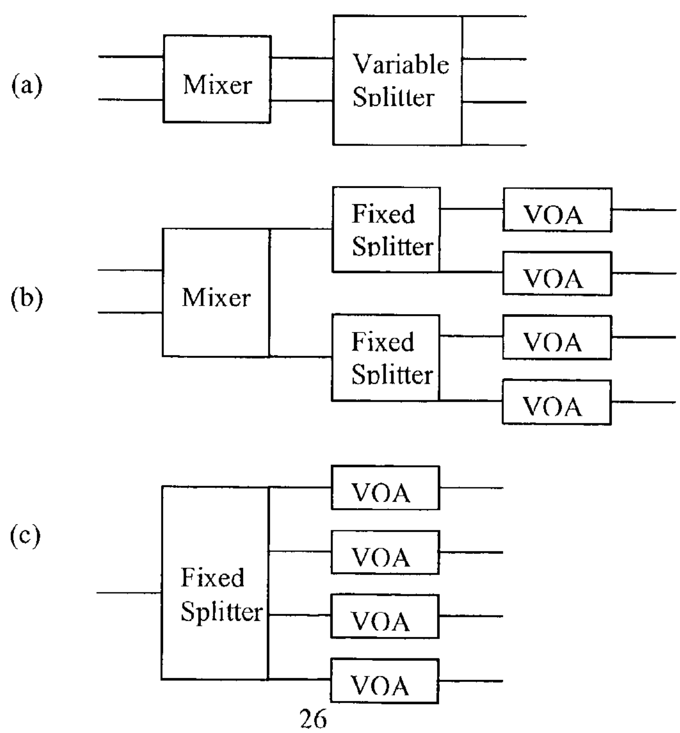
FIG. 4 Diagrammatic representations of some optical power-distribution configurations that illustrate embodiments of the invention.

A proposed optical distribution network may, in general, include one or more of the following components: (1) a mixer having at least two input ports and at least two output ports, (2) a splitter having at least one input port and at least two output ports, and (3) a variable attenuator having at least one input port and at least one output port. The mixer is required if two or more incoherent sources are used in the distribution network; it distributes all input optical energy evenly (or unevenly, if required) among its output ports. The splitter or splitters arbitrarily redistribute this optical energy among their output ports. The splitters may be of the 'fixed' type, with power splitting ratio predetermined by design and fixed during fabrication, or they may be of the 'variable' kind, for which splitting ratios can be dynamically adjusted during the operational lifetime of a device. Variable attenuators are used to reduce power going through one or more ports. They could be positioned anywhere in the network. Diagrams in FIG. 4 illustrate some of the embodiments of the invention.

The primary application of a re-configurable optical distribution network is likely to be in amplifier array modules, where it can be utilized as a pump distribution network. In addition to EDFA's and EDWA's, other types of optical amplifiers may benefit from a pump distribution network such Raman amplifiers, Pr-doped amplifiers, Tm-doped amplifiers and others. Another application of the invention might be in optical broadcasting, where an optical signal is split into many parts and arbitrarily distributed among many ports. Also, since the proposed network in general contains an incoherent mixer, it could serve as a cheap wavelength multiplexer in WDM networks.

Figure 5:
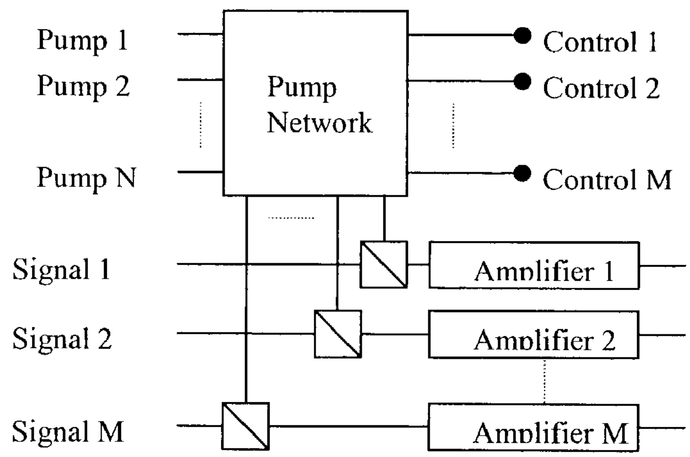
FIG. 5 An example of a variable pump-power distribution network for an amplifier array module.

FIG. 5 illustrates one possible embodiment of such an invention. The module in FIG. 5 incorporates N input pump ports, M input signal ports, an N×M pump distribution network with M controls, M pump-signal couplers, M optical amplifiers, and M output signal ports. The controls in the pump distribution network allow variability in pump distribution among M amplifiers and thus their separate gain control. The amplifiers in this arrangement do not have to be identical. These amplifiers could be either single channel, narrow band, or broadband amplifiers. They could be either completely independent or somehow tied to each other. For example, in the case where M=3, amplifier 1 through 3 could be the $1^{st}$, $2^{nd}$, and $3^{rd}$ stages of a 3-stage in-line EDFA. In this case, the 3 amplifiers would be connected in series with the output of one feeding into the input of the next.

The concept of pump distribution could be implemented using both planar waveguide and regular fiber-optic technologies. However, the planar lightwave circuit (PLC) technology appears to be better suited for its implementation, since it is capable of cost effectively integrating many different optical components into one device. However, hybrid approaches may be beneficial as well. For example, one could use a PLC pump distribution network in combination with fiber-based amplifiers such as EDFA. In this configuration the PLC chip allows efficient pump distribution which is not easily achievable with fiber-optic components, whereas the EDFA's may perform better than their planar waveguide counterparts EDWA's in some applications.

In some instances an amplifier array may not require a variable distribution network. Instead, a designer may know in advance the required splitting ratio of pump energy going into the amplifier array and therefore use a fixed pump distribution network. Such a case is illustrated below for a transceiver module built upon a single PLC chip.

Figure 6:
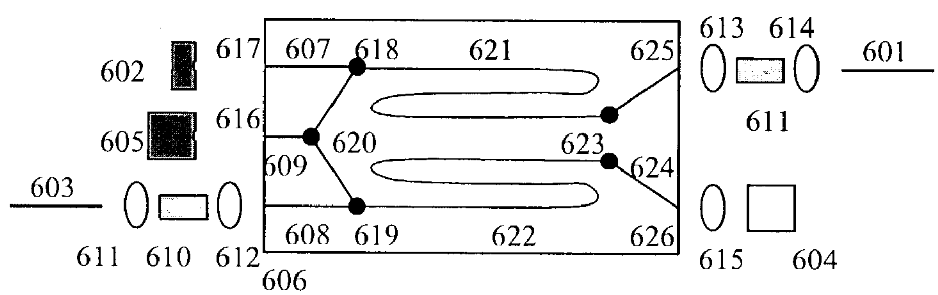
FIG. 6 schematically illustrates the layout of the basic EDWA transceiver module of the present invention.

FIG. 6 schematically shows the layout of an EDWA transceiver module exemplifying the present invention. In general, there may be several optical signals requiring amplification in the transceiver. At least one of the signals is an outgoing signal 601 from the transmitter 602. Its source is a low power single-mode distributed-feedback (DFB) laser with a wavelength tuned to one of the International Telecommunications Union (ITU) grid channels in the C-band. The relatively low power of a DFB-laser limits the transmission range of such a signal. However, this range can be significantly increased by raising the optical output power of the transceiver by means of a power-booster amplifier. In addition, at least one of the signals is an incoming signal 603 to the receiver 604. This receiver might typically, for example, be a PIN-detector with a sensitivity of about −19 dBm. It is known that a sensitivity of this order can be improved by at least about 15 dB using an EDWA pre-amplifier (see, for example, "High sensitivity receiver with an Er-doped waveguide preamplifier", by A. Bruce, C. Bower, G. Weber, A. Hanjani, S. V. Frolov, A. Paunescu, T-M Shen, J. Shmulovich, R. Durvasula and M. Itzler (submitted to Electronics Letters)). This, in turn, will increase the useful transmission range for the incoming optical signal.

The module is comprised of several optical components based on both planar-waveguide and free-space technologies. The planar waveguides are all monolithically integrated onto a single substrate 606, such as silica on silicon. Fibers 601 and 603 in this example are respectively coupled to waveguides 625 and 608 via microlens pairs 613/614 and 611/612, so that bulk isolators 611 and 610 can be placed between the microlenses as shown in FIG. 6. Transmitter laser 602 and pump laser 605 are coupled to waveguides 607 and 609, respectively, via a short sections of lensed (e.g. U.S. Pat. No. 5,774,607, etc.) single-mode fiber 617 and 616, while receiver 604 is coupled to the planar waveguide 626 using a microlens 615. The pump power in waveguide 609 is split by the power splitter 620, with about ⅔ of the pump power being directed towards the booster-amplifier section (composed of waveguide 607, pump-signal combiner 618, Er-doped waveguide 621, pump-kill filter 623 and output waveguide 625) and the remaining ⅓ directed towards the pre-amplifier section (composed of waveguide 608, pump-signal combiner 619, Er-doped waveguide 622, pump-kill filter 624 and output waveguide 626).

Figure 7:
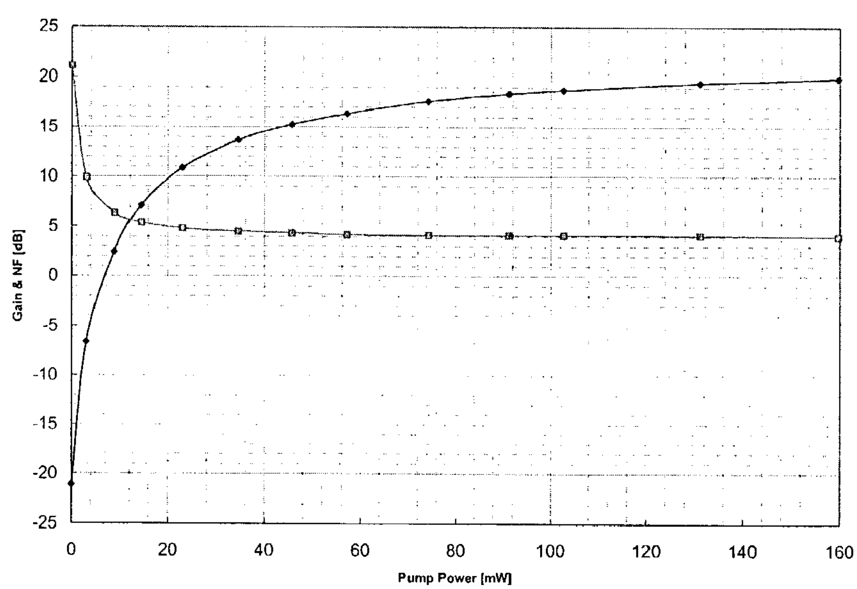
FIG. 7 exemplifies the performance of a representative EDWA as measured by its small-signal gain and noise-figure as a function a pump power.

FIG. 7 shows the increase of small-signal gain and decrease of noise-figure NF for a representative EDWA as a function of increasing (978 nm laser) pump power. The results were obtained for a −25 dBm input signal at a wavelength of 1550 nm. It is seen that a gain of 19.5 dB, with the noise figure of 4 dB, can be achieved using a pump power of 150 mW. In the invention, this same pump laser, with total maximum output power of 150 mW, is used to pump two EDWA's (621 and 622 of FIG. 6) with optical characteristics similar to those shown in FIG. 7. Both EDWA's are monolithically integrated on the same silicon substrate. The pump power is split into two unequal portions, so that about 50 mW of power is used to pump the EDWA serving as a pre-amplifier for the receiver, and about 100 mW of power is used to pump the EDWA serving as a booster amplifier for the signal laser. Under these conditions, according to FIG. 7, one expects a pre-amplifier gain of about 16 dB and a noise figure of 4.3 dB, resulting in a possible receiver sensitivity improvement of about 11.5 dB. Simultaneously, again from FIG. 7, the booster amplifier is providing small-signal gain of about 19 dB, although the actual gain experienced by the signal may be smaller due to gain compression. Gain compression results from the existence of an output saturation power and is a function of input signal power, pump power, and EDWA efficiency. For the EDWA used in generating the performance charateristics of FIG. 7 the output saturation power was about 10 dBm. It follows that such an EDWA can be used in combination with a cheap signal laser (with maximum output power of less than 0 dBm) to boost its output power to a value of the order 10 dBm.

This integrated double-amplifier based on the EDWA technology therefore enables one to achieve a much more compact and cost efficient-solution for building a transceiver than any other currently conceived. First, one can use a cheaper low-power version of the signal laser instead of an expensive high-power counterpart. Second, one can use a low cost PIN receiver instead of an expensive avalanche photodiode (APD). Third, the pump laser is shared between the two amplifiers, so that its cost is not prohibitive. Fourth, the integrated EDWA chip is compact and occupies less space than an EDFA. Fifth, hybrid integration of lasers and PIN's with the EDWA chip further reduces the footprint of the module as shown in FIG. 6 leading to a smaller package and lower packaging costs.

Figure 8:
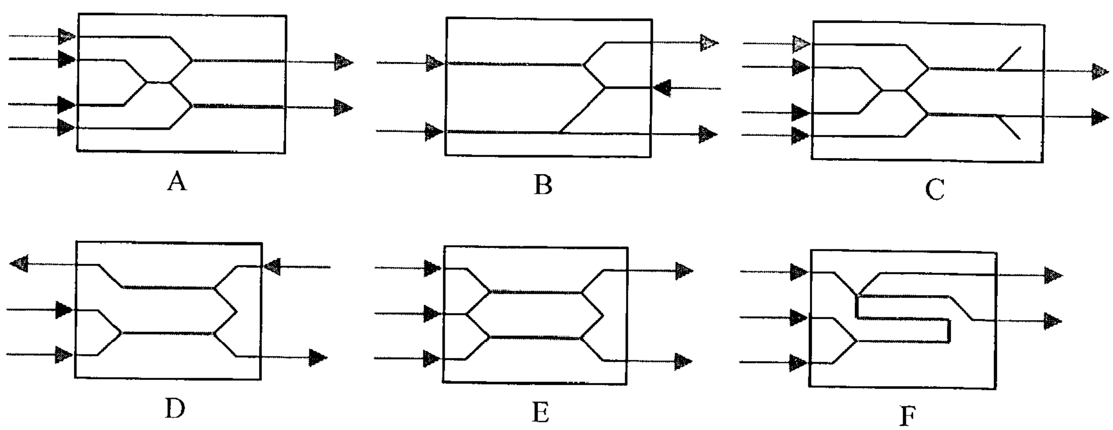
FIG. 8 schematically illustrates several other possible module configurations that utilize the basic principles of the present invention.

FIG. 8 illustrates other examples of the invention. Red arrows indicate inputs from the pump lasers, whereas green arrows indicate inputs and outputs for signal light. Example A shows a scheme where two pump lasers are used to pump an array of two amplifiers. The light from these lasers is first mixed and then split into two parts, one for each amplifier. The $2^{nd}$ pump laser in this case is provided either for redundancy or to increase the pump power. Example B shows how the pump laser can be coupled in the counter-propagating direction with respect to signal. Example C shows a redundantly-pumped amplifier array followed by a matching array of filters and variable optical attenuators. Example D shows how a single pump laser can be used to pump two amplifiers without a splitter. In this example an unused portion of pump energy at the end of the $1^{st}$ amplifier is coupled back onto the $2^{nd}$ amplifier. Example E shows how this approach can be used together with the pump splitter in order to provide the most efficient usage of pump energy. Example F is similar to D, except that the same coupler is used to couple out the signal light from the $1^{st}$ amplifier and couple in the signal light to the $2^{nd}$ amplifier. The input and output positions in these examples are not limited to the ones shown. In general, the receiver and transmitter can be either on the same or on opposite sides of the chip.

Other functional components can be included in a manner similar to the one shown in example C, and it is important to note that all of these can be manufactured using the same technology as that used for the production of an EDWA. Examples may include monolithic integration of such elements as optical taps redirecting a small portion of signal optical power towards a photodetector. The detector could be mounted either on the edge of the chip or on its top; in the latter case a turning mirror is provided below the detector as described in U.S. Pat. Nos. 5,135,605 and 5,966,478. The purpose of the tap is to monitor the output power of the device and its gain. Still other elements might include filters based on waveguide Mach-Zender interferometers, filters based on waveguide gratings, variable optical attenuators, mode converters and others. Mode converters for example are often required to combine two different waveguide media on the same substrate, as described for example in U.S. Pat. No. 5,039,190.

The application of the amplifier array modules, however, may not be limited to the realm of optical tranceivers. Other multichannel devices may benefit from this invention, in particular those devices and systems that require different operating conditions on each or some of the channels. For instance, a device with multiple channels, each channel being at a different signal wavelength such as in an arrayed waveguide grating, will require an amplifier array in which each amplifier is optimized for a specific wavelength. The optimization may involve optimizing the lengths of individual amplifiers in the array, waveguide cross-sections, or individual pump powers. The variation of optical gain, or gain trimming, on each separate amplifier can also be facilitated by providing a variable optical attentuator at the end of each amplifier.

What is claimed is:

1. An integrated optical device for distributing optical pump energy, comprising:

at least one input port for receiving optical energy;

a plurality of output ports; and a user configurable optical network coupled to said input port for distributing said optical energy among said output ports in a prescribed manner in conformance with a user-selected configuration; and wherein said at least one input port comprises a plurality of input ports, said optical network further comprising at least one optical mixer optically coupled to said plurality of input ports, said optical mixer being optically coupled to the plurality of output ports for incoherently mixing said optical pump energy among said plurality of output ports.

2. The optical device of claim 1 wherein said optical network further comprises at least one optical splitter optically coupled to the input port, said optical splitter being optically coupled to the plurality of output ports for distributing said optical energy among said output ports.

3. The optical device of claim 1 wherein said optical network further comprises at least one variable optical attenuator optically coupled to at least one of said ports for providing variable attenuation thereto.

4. The optical device of claim 1 wherein said optical network is formed from a planar lightwave circuit.

5. The optical device of claim 1 further comprising at least two rare-earth doped optical waveguides for receiving the optical pump energy from the optical network.

6. The optical device of claim 2 wherein said optical splitter is a variable optical splitter for dividing the optical pump energy among the plurality of output ports in a user-prescribable manner.

7. The optical device of claim 6 wherein said optical network is formed from a planar light-wave circuit.

8. The optical device of claim 5 wherein said at least two rare-earth doped optical waveguides define individual stages of a multistage optical amplifier in which optical signal power from one stage is coupled into the other stage.

9. The optical device of claim 5 further comprising at least one pump source coupled to the input port such that optical power is distributed from said at least one pump source to said at least two rare-earth doped optical waveguides.

10. The optical device of claim 5 wherein at least one of the said optical rare-earth doped optical waveguides is a planar waveguide.

11. The optical device of claim 5 wherein at least one of said optical rare-earth doped optical waveguides is a planar waveguide and the other optical rare-earth doped optical waveguide is a fiber waveguide.

12. The optical device of claim 5 wherein said rare-earth doped optical waveguides are rare-earth doped optical fibers.

13. The optical device of claim 5 further comprising at least one pump source coupled to the input port such that optical power is distributed from said at least one pump source to said at least two rare-earth doped optical waveguides, wherein said optical network is formed from a planar lightwave circuit.

14. The optical device of claim 13 said optical network and said at least two rare-earth doped optical waveguides are formed on a common substrate.

15. The optical device of claim 2 wherein said optical network is formed from a planar lightwave circuit.

16. An integrated optical device for distributing optical pump energy, comprising:

at least one input port for receiving optical energy;

a plurality of output ports; and a user configurable optical network coupled to said input port configured for distributing said optical energy among said output ports in a prescribed manner in conformance with a user-selected configuration, wherein said optical network further comprises at least one optical splitter optically coupled to the input port, said optical splitter being optically coupled to the plurality of output ports for distributing said optical energy among said output ports, said optical splitter being a variable optical splitter configured for dividing the optical pump energy among the plurality of output ports in a user-prescribed manner.

17. The optical device of claim 16 wherein said optical network further comprises at least one variable optical attenuator optically coupled to at least one of said ports for providing variable attenuation thereto.

18. The optical device of claim 16 wherein said optical network is formed from a planar lightwave circuit.

19. The optical device of claim 16 further comprising at least two rare-earth doped optical waveguides for receiving the optical pump energy from the optical network.

20. The optical device of claim 17 wherein said optical network is formed from a planar lightwave circuit.

21. The optical device of claim 19 wherein said at least two rare-earth doped optical waveguides define individual stages of a multistage optical amplifier in which optical signal power from one stage is coupled into the other stage.

22. The optical device of claim 19 further comprising at least one pump source coupled to the input port such that optical power is distributed from said at least one pump source to said at least two rare-earth doped optical waveguides.

23. The optical device of claim 19 wherein at least one of the said optical rare-earth doped optical waveguides is a planar waveguide.

24. The optical device of claim 19 wherein at least one of said optical rare-earth doped optical waveguides is a planar waveguide and the other optical rare-earth doped optical waveguide is a fiber waveguide.

25. The optical device of claim 19 wherein said rare-earth doped optical waveguides are rare-earth doped optical fibers.

26. The optical device of claim 19 further comprising at least one pump source coupled to the input port such that optical power is distributed from said at least one pump source to said at least two rare-earth doped optical waveguides, wherein said optical network is formed from a planar lightwave circuit.

27. The optical device of claim 26 said optical network and said at least two rare-earth doped optical waveguides are formed on a common substrate.

* * * * *